(12) United States Patent
Elmas et al.

(10) Patent No.: US 10,155,701 B2
(45) Date of Patent: Dec. 18, 2018

(54) O-CHLOROBENZYLIDENE MALONONITRILE (CS) BASED SELF-COMBUSTIBLE PYROTECHNIC COMPOSITIONS WHICH HAVE LOW IGNITION TEMPERATURES

(71) Applicant: TUBITAK, Ankara (TR)

(72) Inventors: Atifet Begüm Elmas, Kocaeli (TR); Şiringül Ay Üresin, Kocaeli (TR); Mehmet Ulutürk, Kocaeli (TR); Bariş Bigeç, Kocaeli (TR); Zekayi Korlu, Kocaeli (TR)

(73) Assignee: TUBITAK, Ankara (TR)

( * ) Notice: Subject to any disclaimer, the term of this patent is extended or adjusted under 35 U.S.C. 154(b) by 0 days.

(21) Appl. No.: 15/537,553

(22) PCT Filed: Dec. 19, 2014

(86) PCT No.: PCT/IB2014/067151
§ 371 (c)(1),
(2) Date: Jun. 19, 2017

(87) PCT Pub. No.: WO2016/097826
PCT Pub. Date: Jun. 23, 2016

(65) Prior Publication Data
US 2017/0369388 A1    Dec. 28, 2017

(51) Int. Cl.
*C06D 7/00*    (2006.01)
*C06D 3/00*    (2006.01)
*C06B 29/00*    (2006.01)
*C06B 23/00*    (2006.01)
*C08K 3/26*    (2006.01)

(52) U.S. Cl.
CPC ............... *C06D 7/00* (2013.01); *C06D 3/00* (2013.01); *C06B 23/006* (2013.01); *C06B 29/00* (2013.01); *C08K 2003/267* (2013.01)

(58) Field of Classification Search
CPC ................................ C06D 3/00; C06D 7/00
See application file for complete search history.

(56) References Cited

U.S. PATENT DOCUMENTS

| | | | |
|---|---|---|---|
| 3,724,382 A | 4/1973 | Zilcosky | |
| 3,912,562 A | 10/1975 | Garner | |
| 3,929,530 A | 12/1975 | Niles | |
| 6,077,371 A * | 6/2000 | Lundstrom | C06B 25/00 149/37 |
| 2012/0247359 A1 * | 10/2012 | Brunn | F42B 8/26 102/334 |
| 2016/0102029 A1 * | 4/2016 | Lombardi | C06D 7/00 149/94 |

FOREIGN PATENT DOCUMENTS

| | | |
|---|---|---|
| EP | 0678492 A1 | 10/1995 |
| WO | WO1994/14637 A1 | 7/1994 |

OTHER PUBLICATIONS

International Search Report dated Aug. 17, 2015.
Written Opinion dated Aug. 17, 2015.

* cited by examiner

Primary Examiner — Mark V Stevens
(74) Attorney, Agent, or Firm — Symbus Law Group, LLC; Clifford D. Hyra

(57) ABSTRACT

O-Chlorobenzylidene malononitrile (CS) based self-combustible pyrotechnic compositions containing polycarbonate (PC) as a binder and 9,10-anthraquinone as a smoke component capable of producing tear gas smoke upon ignition. The pyrotechnic composition comprises an oxidizer and fuel. The formulation further comprises a stabilizer.

6 Claims, 1 Drawing Sheet

[Fig. 1]
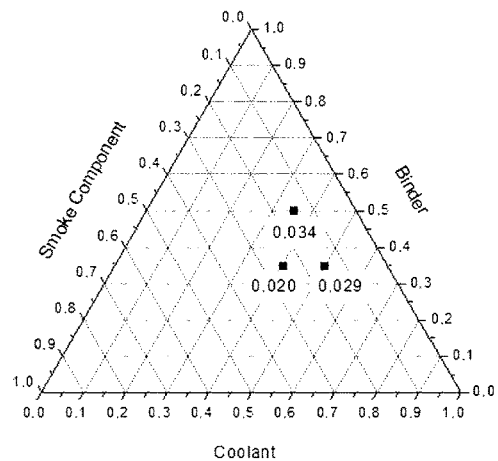
[Fig. 2]
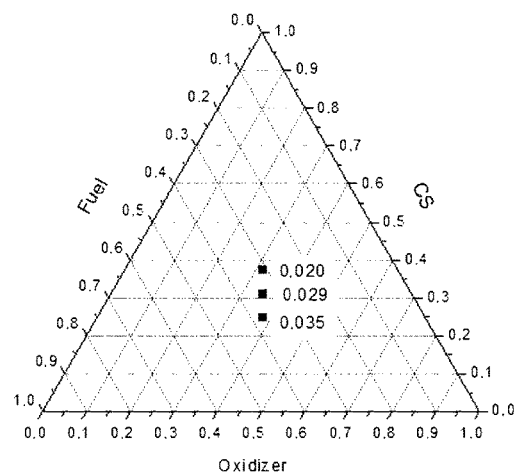
[Fig. 3]
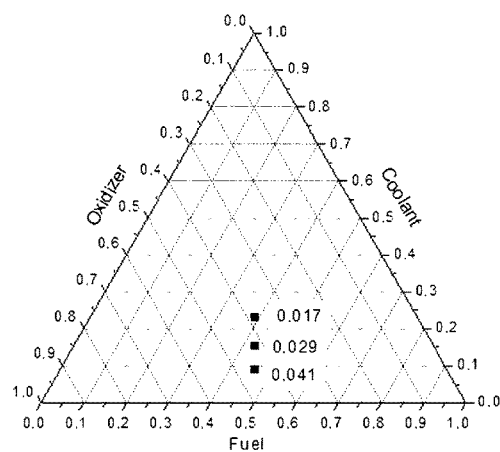

O-CHLOROBENZYLIDENE MALONONITRILE (CS) BASED SELF-COMBUSTIBLE PYROTECHNIC COMPOSITIONS WHICH HAVE LOW IGNITION TEMPERATURES

TECHNICAL FIELD

Embodiments of the present invention relate to pyrotechnic self-combustible riot control compositions that have low toxicity and ignition temperatures.

BACKGROUND ART

O-Chlorobenzylidene malononitrile (CS) is a well-known riot control agent used by law enforcing agencies during civil disturbances and one of the most potent lachrymator skin irritants. CS was synthesized via Knoevenagel condensation of o-chlorobenzaldehyde with malononitrile in the presence of different bases as a catalyst in water (U.S. Pat. No. 7,732,631).

Pyrotechnic compositions are composed of an inorganic oxidizer (potassium chlorate, nitrate or perchlorate) and a combustible organic fuel (lactose or sucrose) to chemically generate heat, light or color. Some additives facilitate burning and improve the processing of the composition. Stabilizer avoids drowning of the compositions owing to melting of one of the constituents. Metal oxide or carbonates such as magnesium carbonate or magnesium hydroxide are widely used as a stabilizer and coolant. Organic dyes such as 1,4-dihydroxy anthraquinone (orange), 1-(p-tolylamino)-4-hydroxy anthraquinone (violet), 1-methylamino anthraquinone (red), and 4,4'-methylidyne-bis-3-methyl-1-phenyl-2-pyrazolin-5-one (yellow) are used in smoke compositions. Binders are widely used to prevent segregation of oxidizers and fuels in pyrotechnic formulations.

Use of a binder also increases the homogeneity of a mixture and possibility of successful ignition. Polymers have been incorporated into pyrotechnic and propellant compositions as binders to improve mechanical properties, sensitivity and manufacturing output of the compositions.

There have been recent efforts to develop pyrotechnic disseminating riot control composition with various specialty binders. Polyester resin (Bryant et. al. U.S. Pat. No. 3,391,036) was used to obtain solid and desired shaped charges. Other polymeric binder based on aromatic sulphur containing epoxy resin was disclosed in Drake et. al. U.S. Pat. No. 3,712,233 which described caseless munition for the dissemination of CS without flaming Kramer patent no. DE 3418116 C1 describes pyrotechnic composition including CS or CN as irritant and polyvinyl acetate as binder to obtain desired shaped munitions. Aliphatic sulfur-containing organic compound cured with aliphatic sulfur containing epoxy resin (Flynn et. al. U.S. Pat. No. 4,190,471), non-halogenated epoxy based resin cured with an organic acid or organic acid anhydride (Kott et. al. U.S. Pat. No. 3,704,187) and liquid epoxy based resins with an organic amine curing agent (Wernett et. al. U.S. Pat. No. 3,467,558) were used in riot control compositions as binders.

Known riot control compositions do not meet the need for compositions which have a low ignition temperature and toxicity. Many disclosed compositions may release toxic and corrosive decomposition products (e.g. hydrogenated or aromatic halogen, hydrogen sulfide) during combustion.

DISCLOSURE

It is an object of preferred embodiments of the present invention to provide a smoke producing pyrotechnic composition for dissemination of CS. An additional object is to provide a munition which has low ignition temperature and toxicity. Low ignition temperature minimizes creation of thermal degradation products which are potentially hazardous to human health.

In a preferred embodiment, sucrose, potassium chlorate, magnesium carbonate hydroxide pentahydrate and 9,10-anthraquinone are pre-ground to a fine powder and passed through a #120-140 mesh sieve. CS is synthesized via Knoevenagel condensation of o-chlorobenzaldehyde with malononitrile in the presence of 1-methyl imidazole as a catalyst in water as described in literature. Purity and yield of CS obtained are >99% and melting point is 93-94° C. A certain amount of polycarbonate (PC) is dissolved in tetrahydrofuran (THF) at 40±5° C. The amount of THF is 1.5 fold excess of total weight of the composition. After dissolution of PC, CS and other powdered ingredients were added to solution. The resultant solution was maintained at 40±5° C. for at least 3 hours during stirring and removing the solvent. The solution is removed from heat and allowed to dry. The dry mixture is added to ball mill and ground back into a fine powder for 30 minutes. Powdered mixture is compressed using a tablet pressing machine at a pressure of 7,000-8,000 pounds to achieve a tablet density of 1.2-1.4 g/cm$^3$. The ignition temperatures of the compositions were determined by differential thermal analysis (DTA). Burning rates were measured at 20±5° C. The burning rate gives information on the speed at which the tablets burn. The following examples are given to better illustrate embodiments of the present invention without limiting them to what is specifically described.

Technical Problem

In pyrotechnic composition, ignition temperature and burning rate are very important parameters. The burning rate determines the amount of evolved gas in a specific time period. The burning rate must not be too slow or fast to obtain effective munitions. Ignition temperature is the temperature at which strong exothermic reaction begins. If the ignition temperature is high (>300° C.), CS may decompose to toxic products like hydrogen cyanide. High temperatures also cause undesirable darkening of the produced smoke and a decrease in smoke production due to burning of components. Additionally, CS-based munitions may cause undesired fires in closed areas. It is recommended that CS-based pyrotechnic mixture should be burnt below 300° C.

Technical Solution

Embodiments of the present invention provide self-combustible CS based pyrotechnic compositions which have low toxicity and ignition temperature. PC was used as a flame retardant in riot control composition for the purpose of preventing undesired fires in enclosed area. PC was also able to bind solid components together to form hard tablets as a binder. Carbonate salts are added to the composition to prevent auto catalytic decomposition of the oxidizer and to act as a buffer. These salts also function as a coolant when the composition is combusted. Magnesium carbonate hydroxide pentahydrate ($(MgCO_3)_4.Mg(OH)_2.5H_2O$) was preferred as a coolant and stabilizer. It also served as a flame suppressant.

Embodiments of the present invention provide pyrotechnic riot control compositions which have relatively low ignition temperatures (<300° C.) to prevent decomposition of CS and undesired fires.

Advantageous Effects

In embodiments of the present invention, PC was used as a binder and fire retardant to obtain CS-based compositions with low ignition temperature. PC is a lightweight polymer and has excellent flame retardant and self-extinguishing properties. PC can be injection/blow molded and extruded. It has good stiffness, melt viscosity, impact strength, modulus, transparency, light transmission, dimensional stability and thermal stability. Polycarbonate was used in gas generant compositions as a binder for inflating a safety bag in the vehicle (Lundstrom et. al. U.S. Pat. No. 6,435,552). Therefore, it is widely used in the fields of optical equipment, construction, automobiles, and electrical and electric devices due to its moldability. In the compositions, sucrose and potassium chlorate were used as fuel and oxidizer, respectively. 9,10-anthraquinone and magnesium carbonate hydroxide pentahydrate were used as the smoke component and coolant in the formulation, respectively.

Some embodiments of the present invention provide pyrotechnic riot control compositions which have a burning rate varying from 0,017-0,041 g/s and ignite at temperatures between 210-220° C.

Example 1

In one embodiment, a pyrotechnic formulation having 25% by weight oxidizer/fuel and 30% by weight CS is prepared according to Table 1.

TABLE 1

25% oxidizer/fuel formulation with 30% CS

| Component Type | Component | Wt. % |
|---|---|---|
| Riot control agent | CS | 30 |
| Binder | PC (TRIREX 3022 IR) | 7 |
| Fuel | Sucrose | 25 |
| Oxidizer | Potassium chlorate | 25 |
| Stabilizer and coolant | Magnesium carbonate hydroxide pentahydrate | 10 |
| Smoke | 9,10-Anthraquinone | 3 |

The burning rate and ignition temperature of the tablets prepared from this composition were 0,020 g/s and 210° C., respectively. The tablet was ignited by first fire, and after ignition, the flame was extinguished. The composition continued to burn without flame. The total weight of the tablet was 0.87 g and the weight of the ash was 0.17 g. The smoke produced had good volume.

Example 2

In one embodiment, a pyrotechnic formulation having 27.5% by weight oxidizer/fuel and 10% by weight coolant is prepared according to Table 2.

TABLE 2

27.5% oxidizer/fuel formulation with 10% coolant

| Component Type | Component | Wt. % |
|---|---|---|
| Riot control agent | CS | 25 |
| Binder | PC (TRIREX 3022 IR) | 7 |
| Fuel | Sucrose | 27.5 |
| Oxidizer | Potassium chlorate | 27.5 |
| Stabilizer and coolant | Magnesium carbonate hydroxide pentahydrate | 10 |
| Smoke | 9,10-Anthraquinone | 3 |

The burning rate and ignition temperature of the tablets prepared from this composition were 0,029 g/s and 217° C., respectively. The tablet ignited as in Example 1. The total weight of the tablet was 0.83 g and the weight of the ash was 0.19 g. The smoke produced had good volume.

Example 3

In one embodiment, a pyrotechnic formulation having 30% by weight oxidizer/fuel and 20% by weight CS is prepared according to Table 3.

TABLE 3

30% oxidizer/fuel formulation with 20% CS

| Component Type | Component | Wt. % |
|---|---|---|
| Riot control agent | CS | 20 |
| Binder | PC (TRIREX 3022 IR) | 7 |
| Fuel | Sucrose | 30 |
| Oxidizer | Potassium chlorate | 30 |
| Stabilizer and coolant | Magnesium carbonate hydroxide pentahydrate | 10 |
| Smoke | 9,10-Anthraquinone | 3 |

The burning rate and ignition temperature of the tablets prepared from this composition were 0,035 g/s and 211° C., respectively. The tablet ignited as in Example 1. The total weight of the tablet was 0.79 g and the weight of the ash was 0.15 g. The smoke produced had good volume.

Example 4

In one embodiment, a pyrotechnic formulation having 27.5% by weight oxidizer/fuel and 8% by weight coolant is prepared according to Table 4.

TABLE 4

27.5% oxidizer/fuel formulation with 8% coolant

| Component Type | Component | Wt. % |
|---|---|---|
| Riot control agent | CS | 25 |

TABLE 4-continued

27.5% oxidizer/fuel formulation with 8% coolant

| Component Type | Component | Wt. % |
|---|---|---|
| Binder | PC (TRIREX 3022 IR) | 7 |
| Fuel | Sucrose | 27.5 |
| Oxidizer | Potassium chlorate | 27.5 |
| Stabilizer and coolant | Magnesium carbonate hydroxide pentahydrate | 8 |
| Smoke | 9,10-Anthraquinone | 5 |

The burning rate and ignition temperature of the tablets prepared from this composition were 0.020 g/s and 217° C., respectively. The tablet ignited as in Example 1. The total weight of the tablet was 0.78 g and the weight of the ash was 0.14 g. The smoke produced had good volume.

Example 5

In one embodiment, a pyrotechnic formulation having 27.5% by weight oxidizer/fuel component and 7% by weight coolant is prepared according to Table 5.

TABLE 5

27.5% oxidizer/fuel formulation with 7% coolant

| Component Type | Component | Wt. % |
|---|---|---|
| Riot control agent | CS | 25 |
| Binder | PC (TRIREX 3022 IR) | 10 |
| Fuel | Sucrose | 27.5 |
| Oxidizer | Potassium chlorate | 27.5 |
| Stabilizer and coolant | Magnesium carbonate hydroxide pentahydrate | 7 |
| Smoke | 9,10-Anthraquinone | 3 |

The burning rate and ignition temperature of the tablets prepared from this composition were 0.034 g/s and 214° C., respectively. The tablet ignited as in Example 1. The total weight of the tablet was 0.80 g and the weight of the ash was 0.16 g. The smoke produced had good volume.

Example 6

In one embodiment, a pyrotechnic formulation having 25% by weight oxidizer/fuel and 15% by weight coolant is prepared according to Table 6.

TABLE 6

25% oxidizer/fuel formulation with 15% coolant

| Component Type | Component | Wt. % |
|---|---|---|
| Riot control agent | CS | 25 |

TABLE 6-continued

25% oxidizer/fuel formulation with 15% coolant

| Component Type | Component | Wt. % |
|---|---|---|
| Binder | PC (TRIREX 3022 IR) | 7 |
| Fuel | Sucrose | 25 |
| Oxidizer | Potassium chlorate | 25 |
| Stabilizer and coolant | Magnesium carbonate hydroxide pentahydrate | 15 |
| Smoke | 9,10-Anthraquinone | 3 |

The burning rate and ignition temperature of the tablets prepared from this composition were 0.017 g/s and 213° C., respectively. The tablet ignited as in Example 1. The total weight of the tablet was 0.81 g and the weight of the ash was 0.17 g. The smoke produced had good volume.

Example 7

In one embodiment, a pyrotechnic formulation having 10% by weight binder component and 25% by weight CS is prepared according to Table 7.

TABLE 7

10% binder formulation with 25% CS

| Component Type | Component | Wt. % |
|---|---|---|
| Riot control agent | CS | 25 |
| Binder | PC (TRIREX 3022 IR) | 10 |
| Fuel | Sucrose | 25 |
| Oxidizer | Potassium chlorate | 25 |
| Stabilizer and coolant | Magnesium carbonate hydroxide pentahydrate | 12 |
| Smoke | 9,10-Anthraquinone | 3 |

The burning rate and ignition temperature of the tablets prepared from this composition are 0.024 g/s and 218° C., respectively. The tablet ignited as in Example 1. The total weight of the tablet was 0.84 g and the weight of the ash was 0.17 g. The smoke produced had good volume.

Example 8

In one embodiment, a pyrotechnic formulation having 29.5% by weight oxidizer/fuel and 25% by weight CS is prepared according to Table 8.

TABLE 8

29.5% oxidizer/fuel formulation with 25% CS

| Component Type | Component | Wt. % |
|---|---|---|
| Riot control agent | CS | 25 |
| Binder | PC (TRIREX 3022 IR) | 7 |

TABLE 8-continued 29.5% oxidizer/fuel formulation with 25% CS

| Component Type | Component | Wt. % |
|---|---|---|
| Fuel | Sucrose | 29.5 |
| Oxidizer | Potassium chlorate | 29.5 |
| Stabilizer and coolant | Magnesium carbonate hydroxide pentahydrate | 6 |
| Smoke | 9,10-Anthraquinone | 3 |

The burning rate and ignition temperature of the tablets prepared from this composition are 0,041 g/s and 213° C., respectively. The tablet ignited as in Example 1. The total weight of the tablet was 0.87 g and the weight of the ash was 0.12 g. The smoke produced had good volume.

The relative amounts of CS, oxidizer and fuel were held constant in FIG. 1. The burning rates ranging from 0,020-0,034 g/s are indicated on the plot. The relative amounts of smoke component, binder and coolant were held constant in FIG. 2. The burning rates ranging from 0,020-0,035 g/s are indicated on the plot. The relative amounts of smoke component, binder and CS were held constant in FIG. 3. The burning rates ranging from 0,017-0,041 g/s are indicated on the plot. Referring to FIGS. 1, 2 and 3, desired burning rate can be obtained by varying relative amounts of components in the compositions. Upon ignition, only white smoke was produced for each of the compositions in FIGS. 1, 2 and 3.

DESCRIPTION OF DRAWINGS

FIG. 1 is a ternary plot showing variation of burning rates of the compositions with relative amounts of binder, coolant and smoke component.

FIG. 2 is a ternary plot showing variation of burning rates of the compositions with amounts of oxidizer, CS and fuel.

FIG. 3 is a ternary plot showing variation of burning rates of the compositions with amounts of oxidizer, coolant and fuel.

BEST MODE

The preferred composition of riot control formulations have the following composition (Example 2):

| Component Type | Component | Wt. % |
|---|---|---|
| Riot control agent | CS | 25 |
| Binder | PC (TRIREX 3022 IR) | 7 |
| Fuel | Sucrose | 27.5 |
| Oxidizer | Potassium chlorate | 27.5 |
| Stabilizer and coolant | Magnesium carbonate hydroxide pentahydrate | 10 |
| Smoke | 9,10-Anthraquinone | 3 |

The burning rate for Example 2 having 27.5% by weight oxidizer/fuel and 10% by weight coolant is within the desired burning rate for tear gas hand grenades and cartridges.

INDUSTRIAL APPLICABILITY

Upon ignition, the heat produced by reaction of fuel and oxidizer causes CS and 9,10-anthraquinone to sublime. The compositions produce tear gas smoke which causes a temporary incapacitation. These compositions can be used as tear gas munitions in hand grenades or cartridges. They have applications in riot control and events requiring special operations by law enforcement personnel.

The invention claimed is:

1. A pyrotechnic self-combustible riot control composition, comprising:
   a. O-Chlorobenzylidene malononitrile (CS) as riot control agent,
   b. fuel,
   c. oxidizer,
   d. polycarbonate as binder,
   e. magnesium carbonate hydroxide pentahydrate as stabilizer, and
   f. dye.

2. A pyrotechnic self-combustible riot control composition according to claim 1, characterised in that the fuel comprises at least one of sucrose or lactose.

3. A pyrotechnic self-combustible riot control composition according to claim 1, characterised in that the oxidizer is potassium chlorate.

4. A pyrotechnic self-combustible riot control composition according to claim 1, wherein the dye comprises one or more of 1,4 dihydroxy anthraquinone, 1-(p-tolylamino)-4-hydroxy anthraquinone, 1-methylamino anthraquinone, 4,4-methylidyne-bis-3-methyl-1-phenyl-2-pyrazolin-5-one or 9,10 anthraquinone.

5. A pyrotechnic self-combustible riot control composition according to claim 1, characterised in that the composition comprises:
   a. 20% to 30% wt CS,
   b. 25% to 30% wt sucrose or lactose,
   c. 25% to 30% wt potassium chlorate,
   d. 7% to 10% wt polycarbonate,
   e. 6% to 15% wt magnesium carbonate hydroxide pentahydrate, and
   f. 3% to 5% wt 9,10 anthraquinone,
with the amounts for each component of the riot control composition selected within the listed range and combined to total no more than 100%.

6. A method for making pyrotechnic self-combustible riot control composition, comprising steps of:
   a. pre-grinding sucrose, potassium chlorate, magnesium carbonate hydroxide pentahydrate and 9,10-anthraquinone to a fine powder and passing the fine powder through a #120-140 mesh sieve,
   b. dissolving polycarbonate (PC) in tetrahydrofuran (THF) at 40±5° C.,
   c. after dissolution of the PC, adding O-Chlorobenzylidene malononitrile (CS) and other powdered ingredients to solution,
   d. maintaining the resultant solution at 40±5° C. for at least 3 hours during stirring and removing the solvent,
   e. removing the resultant solution from heat and allowing the resultant solution to dry into a dry mixture,
   f. adding the dry mixture to a ball mill and grinding the dry mixture into a second fine powder for 30 minutes, and g. compressing the second fine powder using a tablet pressing machine at a pressure of 7,000-8,000 pounds per square inch to achieve a tablet density of 1.2-1.4 g/cm³.

\* \* \* \* \*